Sept. 2, 1958 E. H. GATZERT 2,850,578

TELEPHONE ANSWERING AND INTERCEPT CIRCUIT

Filed May 12, 1954 4 Sheets-Sheet 1

INVENTOR.
ERNEST H. GATZERT
BY T. L. Bowes
ATTORNEY

United States Patent Office 2,850,578

Patented Sept. 2, 1958

2,850,578

TELEPHONE ANSWERING AND INTERCEPT CIRCUIT

Ernest H. Gatzert, Rochester, N. Y., assignor, by mesne assignments, to General Dynamics Corporation, a corporation of Delaware Application May 12, 1954, Serial No. 429,181

8 Claims. (Cl. 179—27)

This invention relates to telephone systems and more particularly to answering circuits for such systems.

In telephone systems to which this present invention is applied, it is desirable to provide a simplified answering means, with subsequent provisions for connecting to any particular line by means of an idle verification switch train. Provision is also made for switchnig from the regular telephone answering means to an optional answering means as service conditions warrant.

The novel features believed to be characteristic of the invention are set forth in the appended claims. The invention, both as to its organization and method of operation, together with further objects and advantages thereof will best be understood by the consideration of the following specification taken in connection with the accompanying drawings in which Fig. 1 is a block diagram of a system embodying principles of my invention, and Figs. 2 to 4, inclusive, taken together and arranged in numerical order with correspondingly numbered lines in alignment, illustrate a circuit arrangement having embodied therein the features of the invention briefly outlined above.

In the following description, the negative side of the common exchange battery is indicated by (—) and the positive side of the exchange battery, which is usually connected to ground, is indicated by (+).

Figure 1:
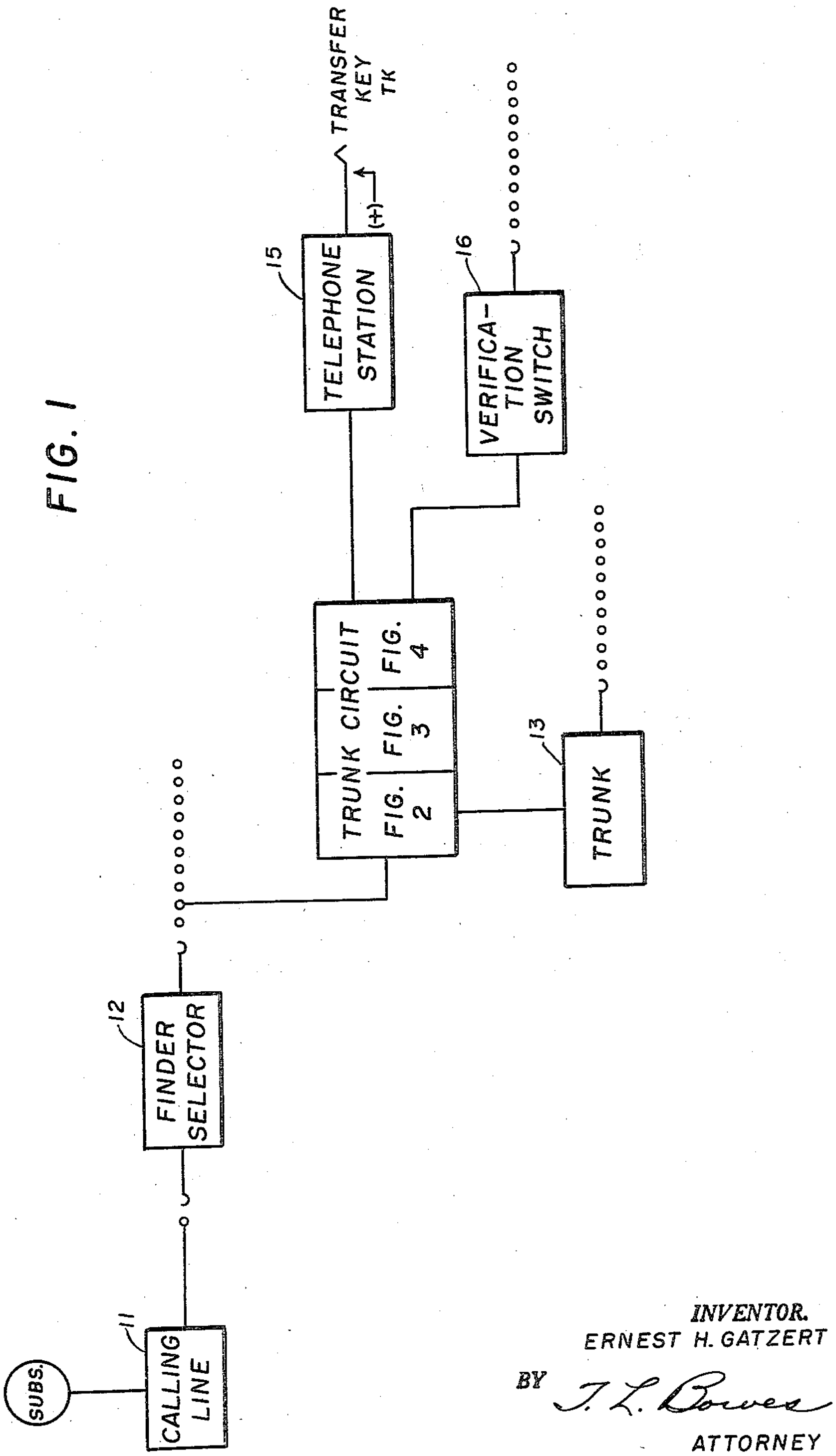

Specifically, Fig. 1 shows in block diagram form a telephone system comprising a calling line 11, and a finder-selector 12 which may be stepped to an idle bank contact in the well known manner. This bank contact terminates on the trunk shown in Figs. 2, 3 and 4 which normally signals the common battery telephone station 15 in the usual manner. Station 15, for example, may be an intercept operator's position. Alternate extensions of the call to the verification switch 16 or to the selector 13 which may be a component of a trunk circuit are also provided as described in the following circuit description.

Figure 2:
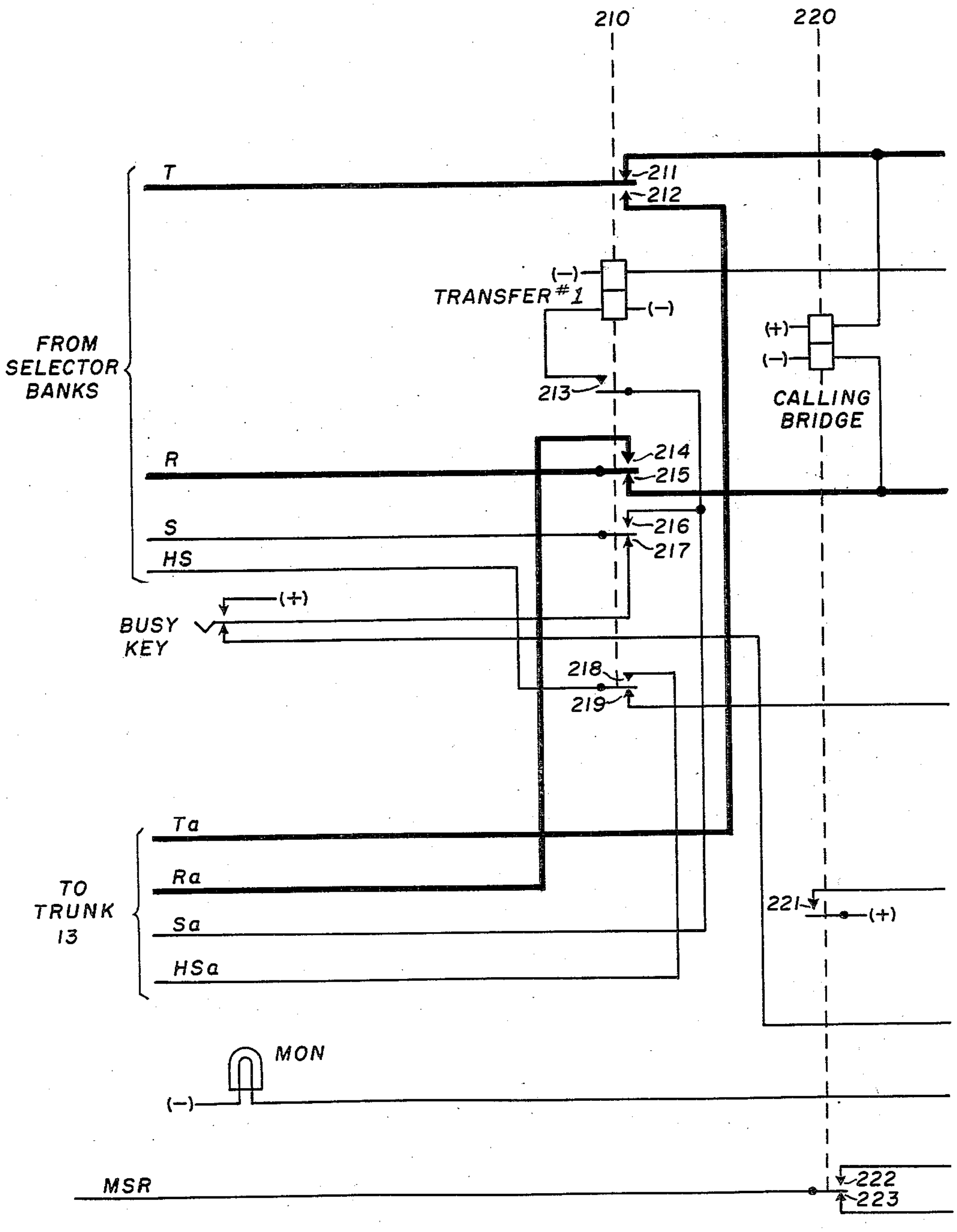
Figure 3:
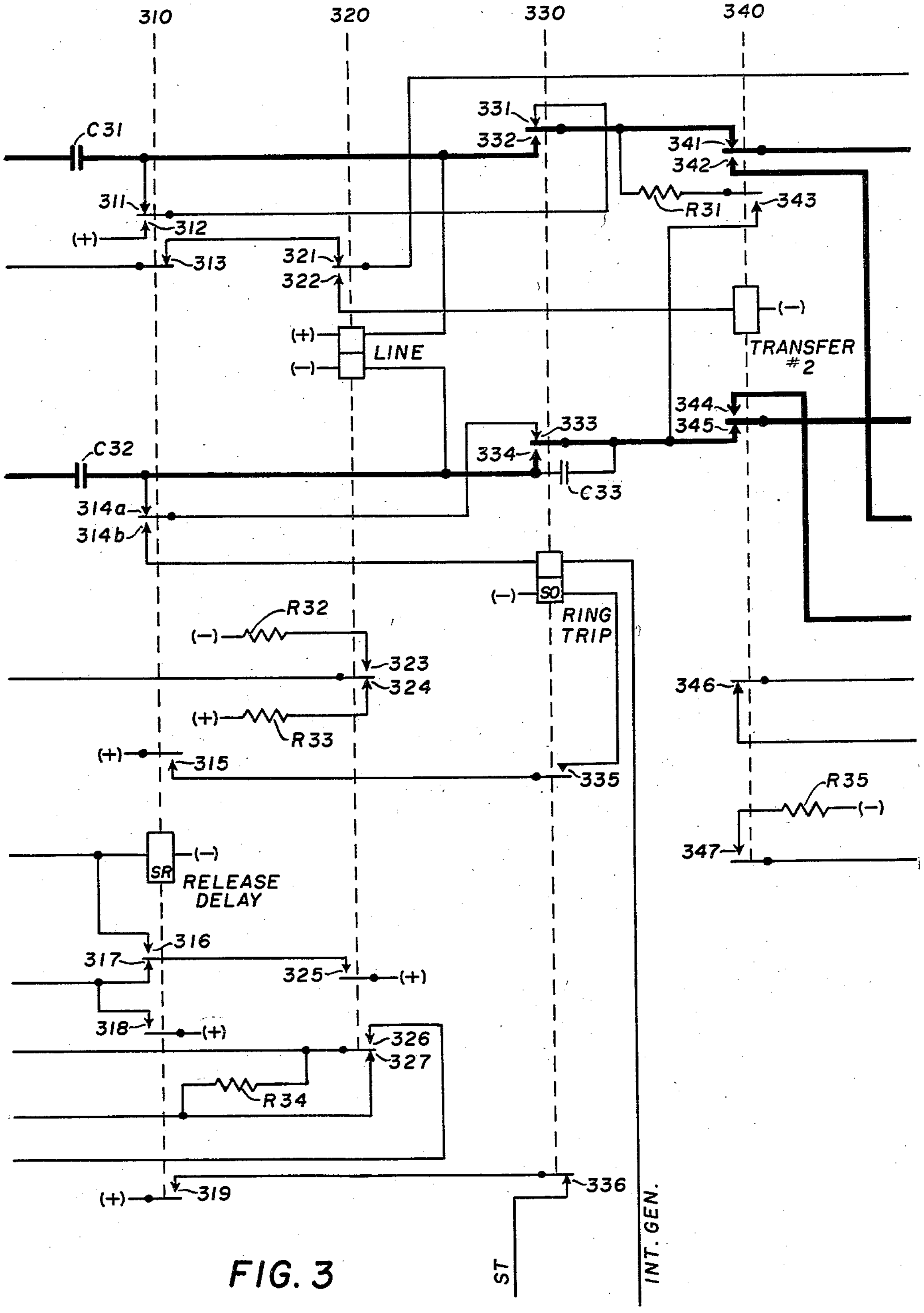
Figure 4:
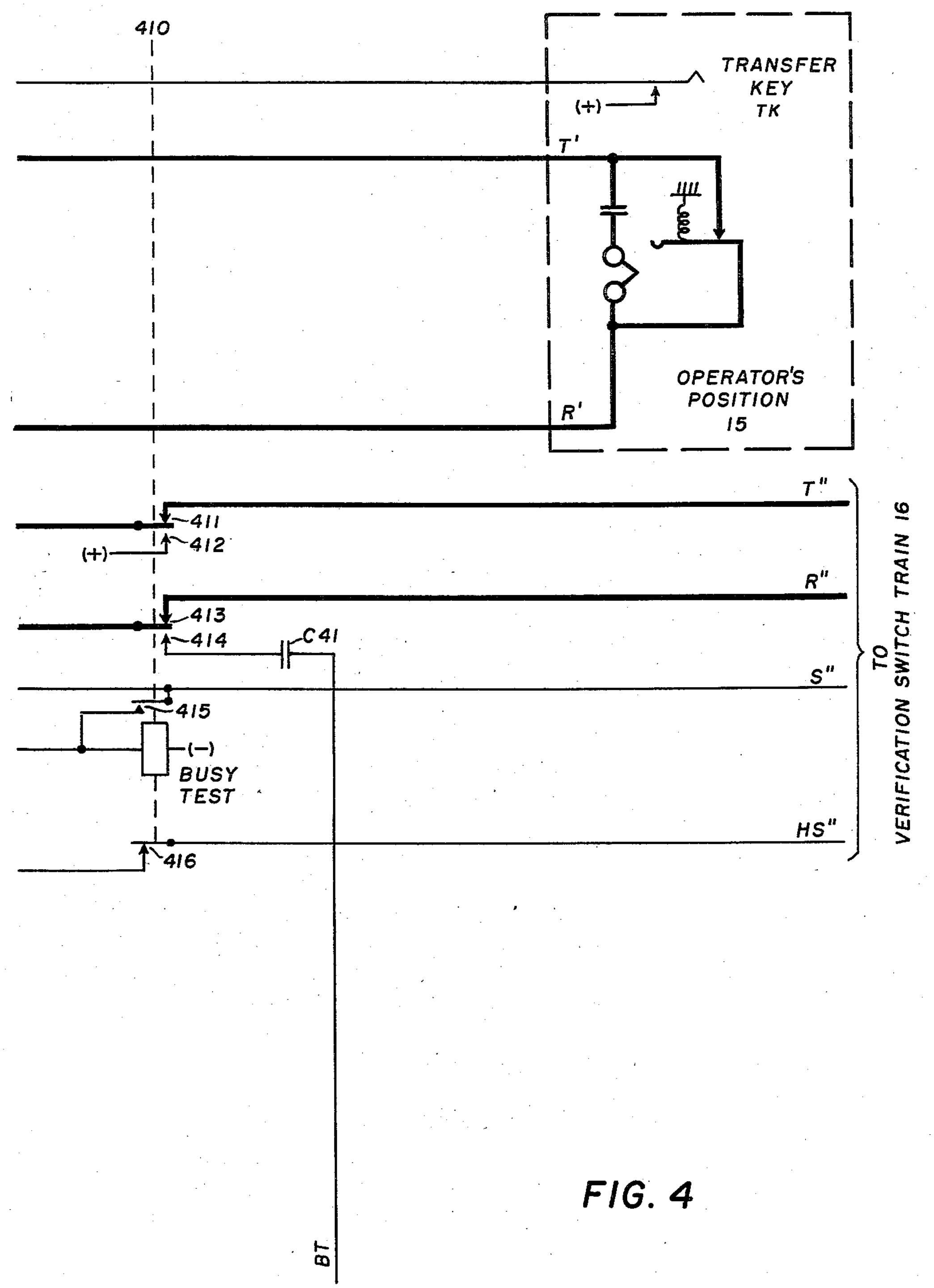

As the incoming call is extended to the apparatus in Figs. 2, 3 and 4, the loop circuit across incoming conductors T and R operates relay 220 from ground through the upper winding of relay 220, normally closed contacts 211, the incoming loop circuit across conductors T and R, normally closed contacts 215, and the lower winding of calling bridge relay 220 to battery.

Operation of relay 220 energizes release delay relay 310 from ground through operated contacts 221 and through the winding of relay 310 to battery. Relay 310 has a slow release characteristic which causes it to remain operated during the momentary opening of ground at contacts 221 during pulsing of relay 220.

Operation of relay 310 closes ground through contacts 319 and 336 to the common start lead ST. Operation of relay 310 also audibly signals the common battery telephone station 15, by connecting ground through operated contacts 312, normally closed contacts 331 and 341, conductors T′ and R′ and audible ringing means connected thereacross, normally closed contacts 345 and 333, operated contacts 314*b*, and the upper winding of ring trip relay 330 to direct battery or interrupted generator and battery connected to lead INT GEN. Ringback tone is also connected to the incoming line over conductor R through capacitor C33 until the call is answered.

When the call is answered at station 15, ring trip relay 330 is operated through the previously described closed loop circuit and the previously described ringing circuit. Operation of relay 330 closes a locking circuit for itself from ground through operated contacts 315 and 335, and the lower winding of relay 330 to battery. Operation of relay 330 also disconnects ground from the common start lead at normally closed contacts 336.

Operation of relay 330 also opens the ringing circuit at contacts 331 and 333 and connects the loop circuit of telephone station 15 through operated contacts 332 and 334 to the windings of line relay 320.

Operation of relay 320 closes a locking circuit for release delay relay 310 from ground through operated contacts 325 and 316, and the winding of relay 310 to battery. Operation of relay 320 also disconnects ground which is normally connected to incoming conductor HS through resistor R33 at normally closed contacts 324 and 219, and connects battery to lead HS through resistor R32 and operated contacts 323. When the call is answered at the called telephone station 15, a talking connection is also established or completed to the calling party through operated contacts 332 and 334 and capacitors C31 and C32.

Means is provided for transferring the connection from position 15 to other apparatus or circuit means, as for example, the verification switch train 16. Thus, if the position 15 is required to use the switch train 16 for verification purposes, a suitable contact device or switch such as a transfer key TK in Fig. 4 is operated to energize transfer #2 relay 340 from ground through the transfer key contacts, operated contacts 322, and the winding of verification or transfer #2 relay 340 to battery.

Operation of relay 340 closes a holding circuit for line relay 320 through resistor R31 and preliminarily operated contacts 343. Operation of relay 340 also connects battery through resistor R35, operated contacts 347 and normally closed contacts 416, to the conductor HS″, for supervision purposes as required, as for example, to a suitable verification switch train. Operation of relay 340 also connects the loop circuit including leads T′ and R′ to station 15 to leads T″ and R″ extending to the verification switch train 16, through operated contacts 342 and 344, and normally closed contacts 411 and 413, respectively. If the verification switch train 16 is already in use, busy test relay 410 will have been operated from ground (not shown) on conductor S″, through normally closed contacts 346 and through the winding of relay 410 to battery. Operation of relay 410 disconnects the verification line circuit at normally closed contacts 411 and 413 and connects ground at contacts 412 to conductor T′ of telephone station 15 to provide a return path for the busy tone on lead BT through capacitor C41 and contacts 414, connected to conductor R′ of telephone 15 through operated contacts 344.

Battery through resistor R35 and operated contacts 347 is disconnected from lead HS″ at contacts 416 when relay 410 is operated.

Restoration of transfer key TK restores relay 340, and disconnects the called telephone 15 from the verification switch train 16 and reconnects the calling party to telephone 15.

Assuming the operator at called telephone station 15 restores the receiver first, relay 320 is restored to open the holding ground, at contacts 325, for relay 310. When the calling party associated with line 11 opens the calling loop, relay 220 restores. Relay 310 also restores as its holding ground is opened at contacts 221. Release of relay 310 disconnects the holding ground from the incoming conductor S at contacts 318 and, when relay 310 is fully restored with relay 320 held by called telephone station 15, ground is reconnected to conductor S through operated contacts 325, normally closed contacts 317, normally closed contacts of the busy key and normally closed contacts 217. If relay 320 is not held by called telephone station 15, ground is not reconnected, as described above, and the equipment in Figs. 2, 3 and 4 may be reused on a subsequent call.

Means is provided for transferring access from preceding apparatus, as a selector for example, to the trunk circuit of Figs. 2, 3 and 4 to other apparatus or circuit means, such as selector 13, for example.

If the transfer key TK in Fig. 4 is operated while no incoming call from selector 12 is being handled, transfer #1 relay 210 operates from ground through the transfer key, normally closed contacts 321 and 313, and the upper winding of transfer relay 210 to battery.

Operation of relay 210 connects the incoming conductors T and R through operated contacts 212 and 214, respectively, to the outgoing conductors T*a* and R*a*, respectively, of the selector 13, as required. The foregoing circuit can be utilized as a night service feature, for example, by using a locking arrangement for key TK.

Operation of relay 210 also connects the incoming conductor S through operated contacts 216 to the outgoing conductor S*a* of selector 13, and also through operated contacts 213 and the lower winding of relay 210 to battery to lock relay 210 to the incoming conductor S.

Operation of relay 210 also connects the incoming conductor HS, through operated contacts 218, to the outgoing conductor HS*a* for supervision purposes.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. In a telephone system, a calling line, an operator's position, selectively operable control means at said position, a first outgoing circuit, a second outgoing circuit, a line relay, a first transfer relay having a set of normally closed contacts and a set of make contacts, a circuit extending normally from said position to said first transfer relay, a second transfer relay having a set of normally closed contacts and a set of make contacts, means including said control means for operating said first transfer relay over said extending circuit, means responsive to the operation of said first transfer relay for connecting said line to said first outgoing circuit, means for completing a connection between said position and said line through both sets of normally closed contacts, means responsive to the answering of a call at said position for operating said line relay, means responsive to the operation of said line relay for disconnecting said normally extending circuit from said first transfer relay in order to prevent operation thereof, means effective when said line relay and said control means at said position are operated for operating said second transfer relay, and means responsive to the operation of said second transfer relay for transferring said connection from said line to said second outgoing circuit through said make contacts of said second relay.

2. In a telephone system, a calling line, an operator's position, means for extending said calling line to said operator's position, control means at said position, selectively operable by an operator at said position to control on an individual call basis the disposition of a call incoming to said position an outgoing circuit, a transfer relay, a circuit extending normally from said position to said transfer relay, means including said control means for operating said transfer relay over said extending circuit, and means responsive to the operation of said transfer relay for connecting said line to said outgoing circuit.

3. In a telephone system, a calling line, an operator's position, selectively operable control means at said position, a first outgoing circuit, a second outgoing circuit, a line relay, a first transfer relay having a set of normally closed contacts and a set of make contacts, a circuit extending normally from said position to said first relay, a second transfer relay having a set of normally closed contacts and a set of make contacts, means for completing a connection between said position and said line through both sets of normally closed contacts, means responsive to the answering of a call at said position for operating said line relay, means responsive to the operation of said line relay for disconnecting said normally extending circuit from said first transfer relay in order to prevent operation thereof, means effective when said line relay and said control means at said position are operated for operating said second transfer relay, and means responsive to the operation of said second transfer relay for transferring said connection from said line to said second outgoing circuit through said make contacts of said second transfer relay.

4. In a telephone system, a calling line, an operator's position, means including a pair of conductors for extending a connection from said line to said position, means at said position for selectively completing a loop across said conductors, an outgoing circuit, and means responsive to the existence of an open loop condition of the last mentioned means for preventing the completion of a connection between said position and said outgoing circuit.

5. In a telephone system, a calling line, an operator's position, means including a pair of conductors for extending a connection from said line to said position, means at said position for selectively completing a loop across said conductors at said position, a first outgoing circuit, a second outgoing circuit, a first relay for connecting said line to said first outgoing circuit, a second relay for connecting said position to said second outgoing circuit, means selectable if said loop across said conductors is closed at said position for operating one of said relays, and means selectable if said loop across said conductors is open at said position for operating the other of said relays.

6. In a telephone system, a calling line, an operator's position, means including a pair of conductors for extending a connection from said line to said position, means at said position for selectively completing a loop across said conductors at said position, a first outgoing circuit, a second outgoing circuit, and means dependent upon whether the loop is closed or open at said position for determining whether said position is connectable to said first outgoing circuit or whether said calling line is connectable to said second outgoing circuit.

7. In a telephone system, a calling line, an operator's position, means including a pair of conductors for extending a connection from said line to said position, means at said position for selectively completing a loop across said conductors at said position, an outgoing circuit, and means responsive to the existence of an open loop condition at said position for disconnecting said line from said position and for connecting said line to said outgoing circuit.

8. In a telephone system, a calling line, an operator's position, means including a pair of conductors for extending a connection from said line to said position, means at said position for selectively completing a loop across said conductors at said position, an outgoing circuit, means responsive to the existence of a closed loop condition at said position for preventing the extension of a connection between said calling line and said outgoing circuit.

References Cited in the file of this patent

UNITED STATES PATENTS

| | | |
|---|---|---|
| 1,811,445 | Tharp | June 23, 1931 |
| 1,893,323 | Crocker | Jan. 3, 1933 |
| 2,520,130 | Deakin | Aug. 29, 1950 |
| 2,549,719 | Stehlik | Apr. 17, 1951 |